United States Patent [19]
Pearce

[11] Patent Number: 6,036,154
[45] Date of Patent: Mar. 14, 2000

[54] CEILING FAN HANGING SYSTEM

[75] Inventor: Richard A. Pearce, Memphis, Tenn.

[73] Assignee: Hunter Fan Company, Memphis, Tenn.

[21] Appl. No.: 08/907,679

[22] Filed: Aug. 8, 1997

Related U.S. Application Data

[60] Provisional application No. 60/024,500, Aug. 9, 1996.

[51] Int. Cl.[7] .............................. B42F 13/00; F01D 25/00
[52] U.S. Cl. ........................ 248/343; 416/5; 416/244 R; 416/246
[58] Field of Search ...................................... 248/343, 342, 248/344, 317; 416/5, 244 R, 246; 362/96, 404, 374, 408, 253, 149

[56] References Cited

U.S. PATENT DOCUMENTS

| | | | |
|---|---|---|---|
| 1,564,609 | 12/1925 | Morgenstern | 362/404 X |
| 2,529,990 | 11/1950 | Barker | 362/220 |
| 2,532,528 | 12/1950 | Zuley | 248/343 X |
| 2,569,859 | 10/1951 | Locke | 248/343 X |
| 2,602,623 | 7/1952 | Sperry | 248/343 |
| 4,162,779 | 7/1979 | Van Steenhoven et al. | 362/404 X |
| 4,222,093 | 9/1980 | Garcia et al. | 362/404 X |
| 4,300,190 | 11/1981 | Mershon | 362/404 |
| 4,837,669 | 6/1989 | Tharp et al. | 362/418 |
| 5,222,864 | 6/1993 | Pearce | 416/5 |

Primary Examiner—Ramon O. Ramirez
Assistant Examiner—Stephen S. Wentsler
Attorney, Agent, or Firm—Garrison, Morris & Haight, PLLC

[57] ABSTRACT

A hanging bracket is initially secured to an electric outlet box. The hanging bracket includes on one of its ends, two canopy hooks with a screw hole located therebetween. The other end of the hanging bracket includes a single screw hole. A canopy includes two spaced slots shaped and located to receive the two canopy hooks of the hanging bracket. With the canopy hooks extending through the corresponding slots in the canopy, a fan assembly is pivotally mounted on the hanging bracket. It is then possible to connect the lead wires of the outlet box and the wires of the fan assembly. All that is then required is to pivot the canopy with the associated fan assembly about the canopy hooks into a vertical orientation. No additional lifting of the fan assembly independent of the fan assembly being supported by the hanging bracket is required. A single screw is inserted through the canopy into the screw hole in the hanging bracket at the end of the hanging bracket opposite to the end which includes the canopy hooks. There is an automatic alignment between the hole in the canopy and the hole in the hanging bracket when the fan assembly is pivoted into a vertical orientation. As another safety precaution, a second screw is inserted through the screw hole in the canopy and into the screw hole in the hanging bracket located between the two canopy hooks.

7 Claims, 3 Drawing Sheets

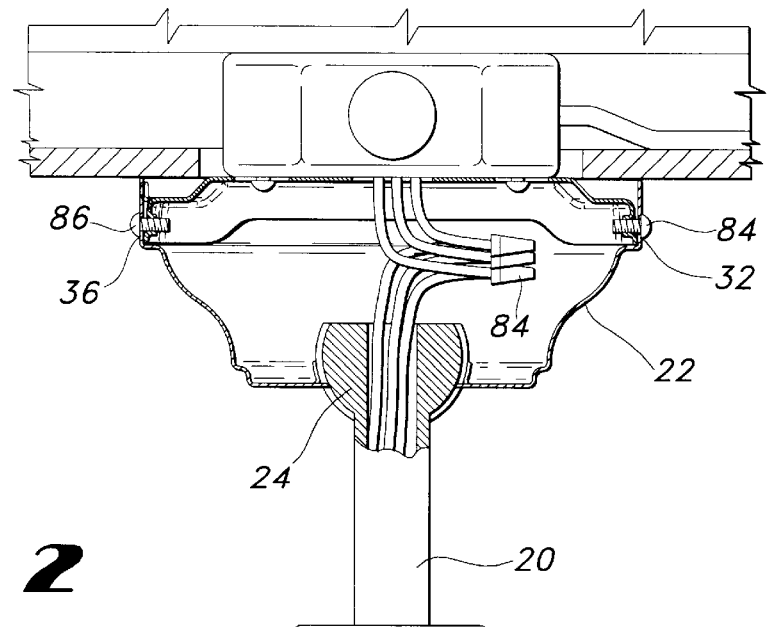
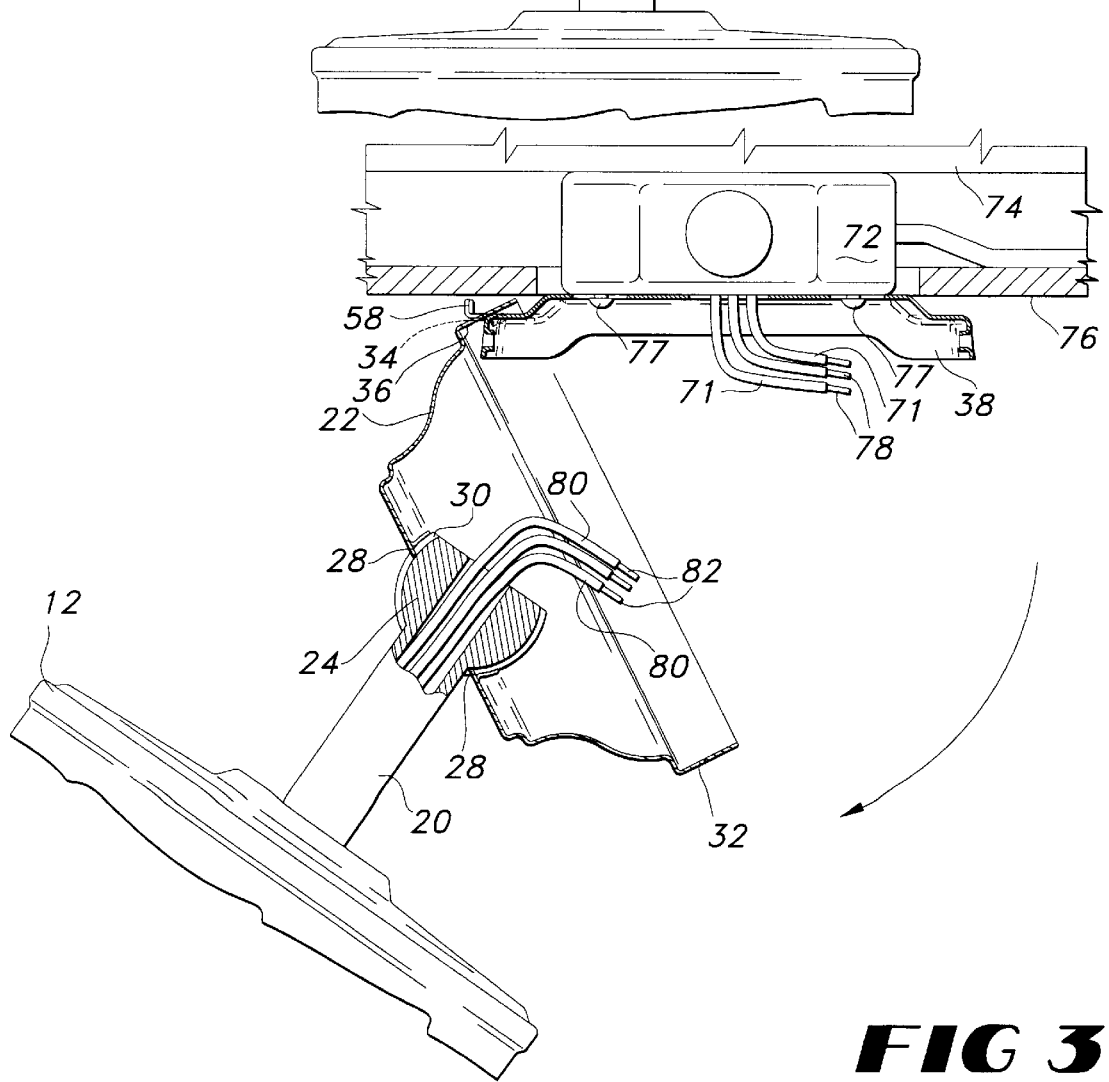

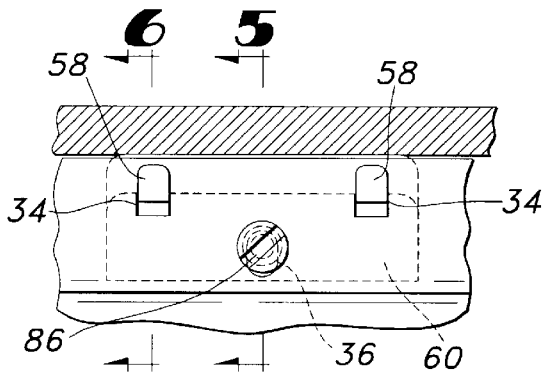
FIG 4
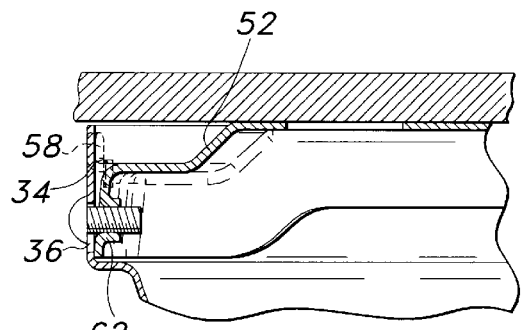
FIG 5
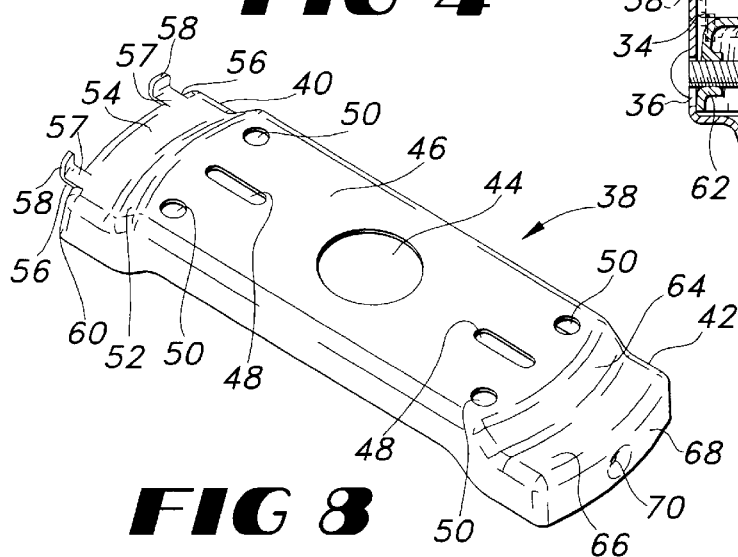
FIG 8
FIG 7
FIG 9

CEILING FAN HANGING SYSTEM

CROSS-REFERENCE

The subject application claims the priority benefits of U.S. Provisional Patent Application having Ser. No. 60/024,500 filed on Aug. 9, 1996, entitled: "Ceiling Fan Hanging System."

FIELD OF THE INVENTION

The present invention relates to a ceiling fan hanging system including a hanging bracket and a canopy which allows a quick, easy, and less cumbersome, installation of a ceiling fan to an electric outlet box.

BACKGROUND OF THE INVENTION

Traditionally, ceiling fans have been installed by a laborious, time consuming and often cumbersome practice. The conventional ceiling plate is secured to an electric outlet box by passing the lead wires of the outlet box through a central circular opening in the ceiling plate. Mounting screws are passed through two elongated openings in the ceiling plate to threadingly engage with two threaded holes diagonally separated from each other on the periphery of the outlet box. Alternatively, wood screws are passed through the ceiling plate and the outlet box and into a wood stud which supports the outlet box. In either event, the screws are tightened until the ceiling plate is securely mounted on the outlet box.

The typical ceiling plate includes a hanging hook having a first portion which extends vertically downward from the ceiling plate at a location approximately one-half way between one end and the central circular opening. The hanging hook terminates in a second portion having a free end which is bent back up towards the central opening of the ceiling plate.

When a typical ceiling fan assembly is mounted to the ceiling plate, the motor, fan blades and an optional light assembly are secured to a canopy by a down rod or hanger rod. The down rod passes through a central opening in the canopy with a ball mount located at an end of the down rod engaged by a periphery of the opening of the canopy. A radially inwardly extending prong projecting from the periphery of the opening of the canopy engages a slot in the ball mount to allow pivoting of the fan assembly with respect to the canopy.

The canopy includes at each of two opposite locations, a hole and an L-shaped groove. When assembled, the fan assembly is lifted by the canopy so that one hole on one side of the canopy is fitted through the free end of the ceiling hook. The fan assembly is thereby suspended from the ceiling hook.

The electrical lead wires from the ceiling plate are then connected to the lead wires from the fan motor. When the electrical connections are completed, a screw is installed in each of the two screw holes located on opposite sides of the ceiling plate.

The installer of the fan assembly, who is usually positioned at an elevated height by a ladder or some other means, must then lift the entire fan assembly and free the fan assembly from the ceiling plate by removing the canopy from engagement with the free end of the ceiling hook. The amount of allowable movement of the fan assembly is limited by the connection of the electrical wire leads. Therefore, only a small amount of movement of the fan assembly is possible before strain is placed on the connections of the wire leads.

The canopy and fan assembly are lifted until the L-shaped grooves on opposite sides of the canopy are fitted over the shanks of the screws secured in the opposite sides of the ceiling plate. The canopy is at first lifted vertically until the shank of each screw engages the bottom of the portion of the L-shaped groove which is initiated at the uppermost edge of the canopy. The canopy and therefore the entire fan assembly is then twisted so that the shanks of the screws in the ceiling plate slide in the remaining portion of the L-shaped grooves in the canopy.

The canopy of the fan assembly is twisted until the holes at the opposite sides of the canopy are aligned with the two remaining screw holes in the opposite sides of the ceiling plate. A third and fourth screw are inserted, respectively, through the opposite sides of the canopy and into the ceiling plate to anchor the canopy and thus the entire fan assembly on the ceiling plate and suspend the fan from the ceiling.

SUMMARY OF THE INVENTION

In view of the foregoing disadvantages associated with known systems for installing a ceiling fan, the present invention provides a hanging bracket and canopy for securing a fan assembly to an electric outlet box in a faster, easier and less cumbersome operation than is currently available.

This is achieved by the use of a hanging bracket and a canopy incorporating the principles of the present invention. The hanging bracket is initially secured to an electric outlet box. The hanging bracket includes two canopy hooks on one of its ends. A screw hole is located between the two canopy hooks. The other end of the hanging bracket is provided with a single screw hole. The canopy includes two spaced slots shaped and located to receive the two canopy hooks of the hanging bracket. With the canopy hooks extending through the corresponding slots in the canopy, the fan assembly is pivotally mounted on and suspended from the hanging bracket. This allows the installer to have full use of both hands to connect the lead wires of the outlet box and the wires of the fan assembly. The installer can then easily pivot the fan assembly about the canopy hooks into a vertical orientation. No additional lifting of the fan assembly, independent of the fan assembly being supported by the hanging bracket, is required.

To further secure the assembly, a second screw is inserted through a hole in the canopy and into the screw hole in the hanging bracket located between the two canopy hooks. A single screw is inserted through the canopy into the screw hole in the hanging bracket at the end of the hanging bracket opposite the end which includes the canopy hooks. There is an automatic alignment between the hole in the canopy and the screw hole in the hanging bracket when the fan assembly is pivoted into a vertical orientation.

The hanging bracket embodying the teachings of the present invention provides for a direct connection between the lead wires and fan assembly wires. Increased accessibility to the lead wires in the outlet box is achieved since the canopy is pivoted on canopy hooks located at an outermost edge of the hanging bracket.

Accordingly, by the present invention, the installer need only lift the fan assembly once to suspend to fan assembly by the hooks on the hanging bracket. When the wiring of the fan assembly is completed, the installer simply pivots the canopy about the canopy hooks on the hanging bracket to move the fan assembly into is final position of use.

It is therefore another object of the present invention to provide a ceiling fan hanging system including a hanging bracket and a canopy with the hanging bracket mounted to an electric outlet box. The hanging bracket has at least one canopy hook which fits through an opening in the canopy to pivotally mount the canopy and its associated ceiling fan assembly on the hanging bracket. This feature allows connection of electric lead wires and subsequent pivoting of the canopy and its associated ceiling fan assembly to a vertical position where the canopy is then fixed to the hanging bracket.

It is still another object of the present invention to provide a ceiling fan hanging system having a hanging bracket and a canopy pivotally mounted on the hanging bracket so that only a single lifting of the ceiling fan and pivoting of the canopy on the hanging bracket is required for installation of the ceiling fan in a vertical orientation.

It is still yet another object of the present invention to quickly, and easily install a ceiling fan on an electric outlet box by pivotally mounting a ceiling fan canopy on a hanging bracket secured to the electric outlet box so that the installer only has to lift the ceiling fan once to pivotally mount the canopy on the hanging bracket, and on completion of the electrical interconnection of the lead wires, pivot the canopy and the ceiling fan to a vertical orientation and alignment of a hole in the canopy and a screw hole in the hanging bracket to fix the canopy with the ceiling fan in a vertical orientation.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 2 is a partial sectional view taken along line 2—2 of FIG. 1.

FIG. 3 is a partial sectional view illustrating an initial hanging position of a canopy and its associated fan motor, pivotally mounted on a hanging bracket secured to an electric outlet box.

FIG. 4 is an enlarged detail view illustrating the interconnection between the canopy hooks of the hanger bracket extending through slots in the canopy.

FIG. 5 is a sectional view taken along line 5—5 in FIG. 4.

FIG. 7 is an enlarged view of one end of the hanging bracket including the two canopy hooks and a threaded opening located between the two canopy hooks on the side of the end of the hanging bracket.

FIG. 8 is a perspective view of the hanging bracket of the hanging system embodying the principles of the present invention.

FIG. 9 is a perspective view of the canopy of the hanging system embodying the principles of the present invention.

DETAILED DESCRIPTION OF THE PREFERRED EMBODIMENTS

Figure 1:
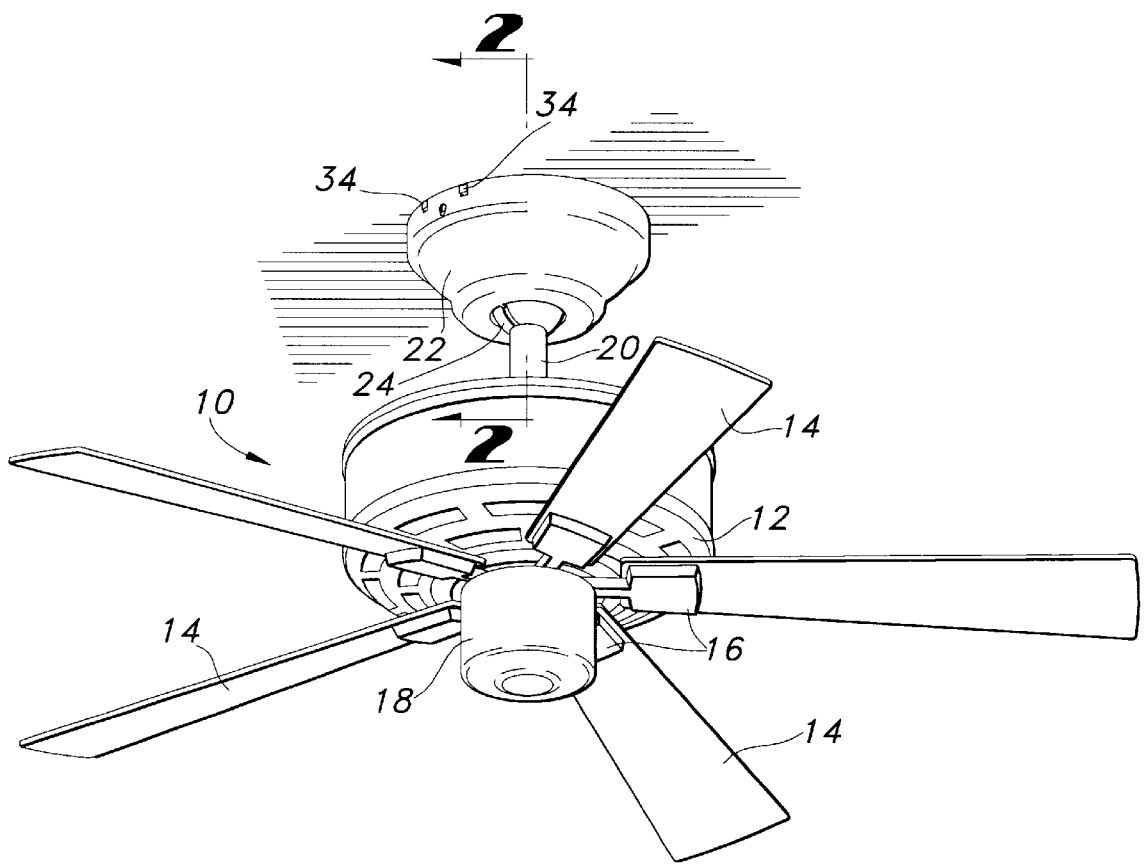
FIG. 1 is a perspective view of a ceiling fan including the hanging system of the present invention.
Figure 6:
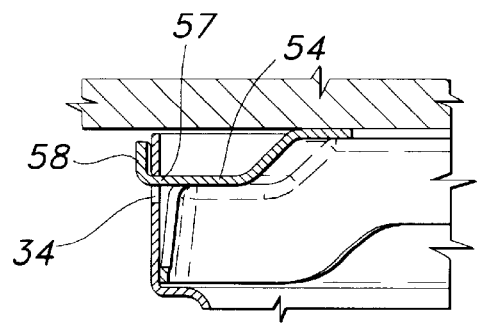
FIG. 6 is a sectional view taken along line 6—6 in FIG. 4.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1–3, in particular, a ceiling fan hanging system embodying the teachings of the subject invention is generally designated as 10. With reference to its orientation in FIG. 1, the ceiling fan 10 includes a fan motor housing 12, a plurality of fan blades 14 mounted by brackets 16 to the motor, and a switch housing 18 to which a light fixture (not shown) may optionally be mounted. A downrod 20 interconnects the motor in the motor housing 12 and a canopy 22 by a ball mount 24.

Referring to FIGS. 3 and 9 the canopy 22 includes a central opening 26 for receipt of the ball mount 24. Fingers 28 project radially into the opening 26 so as to engage in a groove 30 in the ball mount 24.

On one side of the canopy 22 is a circular opening 32. On an opposite side of the canopy 22 are two rectangular shaped slots 34 with an oval opening 36 located there between, as seen in FIG. 4.

Cooperating with the canopy is a hanging bracket 38 as shown in FIG. 8. The hanging bracket includes opposite ends 40 and 42. A central circular opening 44 is located in flat top plate 46. In addition, two elongated holes 48 are located in top plate 46 along with four circular holes 50.

At end 40, top plate 46 tapers by inclined ramp surface 52 to flat surface 54. Two L-shaped canopy hooks 56 project from end 40. A portion 57 of the hooks 56 extends in the plane of surface 54. The hooks 56 and portions 57 terminate in upstanding projections 58 which extend substantially perpendicular to portion 57. Located between the hooks 58, as best seen in FIGS. 5 and 7, on side surface 60, is a threaded opening 62.

At the opposite end 42 of hanging bracket 38 is an inclined ramp surface 64 leading from top plate 46 down to another flat surface 66. A side surface 68 at end 42 includes threaded circular opening 70. As shown in FIGS. 2, 3, 5 and 6, surfaces 54 and 66 are upwardly facing surfaces and side surfaces 60 and 68 extend downwardly from the upwardly facing surfaces 54 and 66, respectively.

Both side surfaces 60 and 68 include a curvature matching an inner curvature of the canopy 22. This allows for the hanging bracket 38 to fit inside of canopy 22 and contact the canopy along its inner edge. The spacing of the surfaces 54, 66 below top plate 46 allows clearance for pivoting of the canopy on the canopy hooks 58 while also maximizing space between the canopy 22 and the hanging bracket 38 for connection of lead wires.

Referring again to FIGS. 3 and 8 in the installation of the ceiling fan hanging system according to the principles of the present invention, the hanging bracket 38 is initially secured to the outlet box 72 by two screws 77 which extend through the slots 48 and engage in threaded openings in the outlet box 72. The outlet box is fixed in a ceiling 76 to a stud 74 or to an expandable bracket (not shown) located between two ceiling studs. Alternatively, wood screws (not shown) pass through the holes 50 in the hanging bracket and are secured to stud 74 located above the outlet box.

The canopy 22, with its associated fan assembly, as connected to ball mount 24, is lifted and hung from the canopy hooks 56 of the hanging bracket 38 as shown in FIG. 3. The openings 34 are initially passed over the portions 58 of the canopy hooks 56 and the uppermost edge of the openings 34 allowed to rest on the portion 57 of the canopy hooks 56. In this position, the canopy and thus the fan assembly, as pivotally supported by ball mount 24 in opening 26 of canopy 22, is hung from the ceiling bracket 38.

Lead wires 71 extend from electric outlet box 72 and are connected to a power source not shown. The lead wires 71 include stripped ends 78. The fan assembly includes corresponding lead wires 80 extending through the ball mount 24 and down rod 20, also having stripped ends 82.

With the canopy 22 and thus its associated ceiling fan assembly suspended from the hanging bracket 38, the installer of the ceiling fan can use both hands to connect the lead wires 71, 80 with wire nut connectors 84 as seen in FIG. 2. Since the canopy 22 is hung from the edge of an end 40 of the hanging bracket 38, maximum space is provided between the hanging bracket 38 and the canopy 22 for connection of the lead wires 71, 80.

Once the lead wires are connected, the installer can then very easily and safely pivot the canopy 22 to the position shown in FIG. 2. A screw 84 is then passed through opening 32 in the canopy 22 and into threaded opening 70 in end 42 of hanging bracket 38. The canopy is dimensioned to surround the hanging bracket and cover it from view when the fan assembly is in a position of use.

As an additional safety feature, before the wires are connected, a screw 86 may be passed through the oval opening 36 in the side of the canopy 22 through which the canopy 22 hooks 58 project. The oval shape of opening 36 allows the screw 86 to be inserted while the fan assembly is suspended at an angle. The screw 86 also engages threaded opening 62 so as to prevent the canopy from becoming dislodged. In the assembled condition, only the portions 58 of the canopy hooks 56 are visible through the canopy 22 in addition to the screw heads of screws 84 and 86.

Accordingly, by the present invention, a safer, more user friendly and quick installation of a ceiling fan is achieved by a single lifting of the ceiling fan assembly. The pivotal mounting of the canopy allows for support of the canopy at all times once the canopy hooks have been passed through openings in the side of the canopy.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A ceiling fan hanging system comprising:
    a hanging bracket for attachment to an electric outlet box,
    a canopy for supporting a ceiling fan, said canopy pivotally supported on said hanging bracket,
    said hanging bracket including a substantially flat top plate and first and second ends opposite one another, each of said first and second, opposite ends including an upwardly facing surface connected to said top plate by an inclined ramp whereby said upwardly facing surfaces of said first and second ends are spaced below said top plate,
    said hanging bracket further including at least one canopy hook extending away from said first end of said hanging bracket,
    said canopy including at least one opening for receiving said at least one canopy hook which, in combination with the spacing of said upwardly facing surfaces of said first and second ends below said top plate of said hanging bracket, permits said canopy to pivot on said hanging bracket from an initial, hanging position to a second, installed position in surrounding relationship with said hanging bracket,
    wherein:
    said canopy includes an inner curvature and said second end of said hanging bracket includes a side surface extending downwardly from said upwardly facing surface of said second end of said hanging bracket, said side surface having a curvature which substantially matches said inner curvature of said canopy, said side surface of said second end of said hanging bracket including a threaded opening;
    said canopy includes an opening which is aligned with said threaded opening when said canopy is pivoted on said hanging bracket to said second, installed position.

2. A ceiling fan hanging system as claimed in claim 1, wherein said hanging bracket includes another threaded opening located at said first end for alignment with another opening in said canopy when said canopy is pivoted on said hanging bracket to said second, installed position.

3. A ceiling fan hanging system comprising:
    a hanging bracket for attachment to an electric outlet box,
    a canopy for supporting a ceiling fan, said canopy pivotally supported on said hanging bracket,
    said hanging bracket including a substantially flat top plate and first and second ends opposite one another, each of said first and second, opposite ends including an upwardly facing surface connected to said top plate by an inclined ramp whereby said upwardly facing surfaces of said first and second ends are spaced below said top plate,
    said hanging bracket further including at least one canopy hook extending away from said first end of said hanging bracket,
    said canopy including at least one opening for receiving said at least one canopy hook which, in combination with the spacing of said upwardly facing surfaces of said first and second ends below said top plate of said hanging bracket, permits said canopy to pivot on said hanging bracket from an initial, hanging position to a second, installed position in surrounding relationship with said hanging bracket,
    wherein:
    said upwardly facing surfaces of said first and second ends of said hanging bracket are substantially flat;
    said at least one hook comprises two canopy hooks and wherein there are two corresponding openings in said canopy for receiving said canopy hooks;
    each of said canopy hooks is L-shaped and includes a first portion extending in a direction substantially parallel with said substantially flat, upwardly facing surface of said first end of said hanging bracket and a free end portion extending substantially perpendicular to said first portion and said flat surface of said first end of said hanging bracket;
    said canopy includes an inner curvature and said second end of said hanging bracket includes a side surface extending downwardly from said upwardly facing surface of said second end of said hanging bracket, said side surface having a curvature which substantially matches said inner curvature of said canopy, said side surface of said second end of said hanging bracket including a threaded opening;
    said canopy includes an opening which is aligned with said threaded opening when said canopy is pivoted to said second, installed position.

4. A ceiling fan hanging system as claimed in claim 3, wherein:
    said first end of said hanging bracket includes a side surface extending downwardly from said upwardly facing surface of said first end of said hanging bracket, said side surface of said first end having a curvature which substantially matches said inner curvature of said canopy;

said inner curvature of said canopy combining with said substantially matching curvatures of said side surfaces of said first and second ends of said hanging bracket to permit said hanging bracket to fit inside of said canopy when said canopy is in said second, installed position whereby said hanging bracket is substantially obscured from view.

5. A ceiling fan hanging system for installing a ceiling fan on an electric outlet box, said ceiling fan hanging system comprising:

a hanging bracket including holes for passage therethrough of screws to mount said hanging bracket on the electric outlet box, and a canopy having an opening for supporting a ball mount of the ceiling fan and at least one radially inward projection for engaging and guiding pivotal movement of the ball mount, said hanging bracket further including a central portion and first and second, opposite ends which are separated from said central portion by inclined ramps so as to space said opposite ends below said central portion, said hanging bracket and said canopy including a corresponding number of hooks and openings, respectively, for pivotally mounting said canopy on said hanging bracket and for swinging of said canopy from an initial, hanging position to a second, installed position surrounding said hanging bracket so as to secure said canopy to said hanging bracket, wherein said hooks of said hanging bracket comprises two canopy hooks, each having one portion projecting away from said first end of said hanging bracket and another portion extending substantially perpendicular to said one portion, wherein said hanging bracket further includes a threaded opening in said second end, and said canopy includes an opening corresponding to said threaded opening for passage of a connector therethrough so as to secure said canopy to said hanging bracket when said hanging bracket is in said second, installed position.

6. A ceiling fan hanging system as claimed in claim 5, wherein said hanging bracket further includes another threaded opening located at said first end of said hanging bracket and between said two canopy hooks for alignment with another opening of said canopy and passage of a connector therethrough upon pivoting of said canopy to said second, installed position where said canopy is secured to said hanging bracket.

7. A ceiling fan hanging system for installing a ceiling fan on an electric outlet box, said ceiling fan hanging fan system comprising:

a hanging bracket including holes for passage therethrough of screws to mount said hanging bracket on the electric outlet box, and a canopy having an opening for supporting a ball mount of the ceiling fan and at least one radially inward projection for engaging and guiding pivotal movement of the ball mount, said hanging bracket and said canopy including a corresponding number of hooks and openings, respectively, for pivotally mounting said canopy on said hanging bracket and for swinging of said canopy to a position surrounding said hanging bracket so as to secure said canopy to said hanging bracket, wherein said hanging bracket further includes a first end and said hooks of said hanging bracket comprise two canopy hooks, each having one portion projecting away from said first end of said hanging bracket and another portion extending substantially perpendicular to said one portion, said hanging bracket further includes a second end opposite to said first end and a threaded opening formed in said second end, said canopy having an opening corresponding to said threaded opening for passage of a connector therethrough so as to secure said canopy to said hanging bracket, said hanging bracket further includes a central portion, said first and second, opposite ends of said hanging bracket being separated from said central portion by inclined ramps so as to space said opposite ends below said central portion.

* * * * *